US008659676B2

(12) United States Patent
Hsu

(10) Patent No.: US 8,659,676 B2
(45) Date of Patent: Feb. 25, 2014

(54) IMAGE ANALYSIS DEVICE AND METHOD THEREOF

(75) Inventor: Pei-Hua Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 250 days.

(21) Appl. No.: 13/340,697

(22) Filed: Dec. 30, 2011

(65) Prior Publication Data

US 2013/0128080 A1 May 23, 2013

(30) Foreign Application Priority Data

Nov. 17, 2011 (TW) .............................. 100142070 A

(51) Int. Cl.
*H04N 5/235* (2006.01)
*H04N 5/262* (2006.01)

(52) U.S. Cl.
USPC ....................................... 348/229.1; 348/239

(58) Field of Classification Search
USPC .................. 348/222.1, 229.1, 239, 218.1; 382/282–284
See application file for complete search history.

(56) References Cited

U.S. PATENT DOCUMENTS

| 7,352,393 | B2 * | 4/2008 | Sakamoto ...................... 348/239 |
| 8,472,717 | B2 * | 6/2013 | Wang et al. .................... 382/173 |
| 2007/0230939 | A1 * | 10/2007 | Tanaka et al. ................. 396/155 |
| 2009/0245657 | A1 * | 10/2009 | Osugi ............................ 382/209 |
| 2009/0284613 | A1 * | 11/2009 | Kim ............................ 348/222.1 |
| 2012/0033072 | A1 * | 2/2012 | Lin ............................... 348/143 |
| 2013/0010161 | A1 * | 1/2013 | Lu et al. ........................ 348/234 |

* cited by examiner

*Primary Examiner* — Kelly L Jerabek
(74) *Attorney, Agent, or Firm* — Altis Law Group, Inc.

(57) ABSTRACT

A method for analyzing images includes: obtaining at least one brightness value of at least one area of an image of a scene; obtaining a brightness value of the same at lease one area of each of a predetermined number of previous images of the scene and calculating an average brightness of the same at lease one area of the predetermined number of previous images to obtain at least one average brightness value; comparing the at least one brightness value of the image with that of the predetermined number of previous images to obtain at least one brightness difference value; comparing the at least one brightness difference value with a first value and a second value; adjusting a reference background model according to a first adjustment mode or a second adjustment according to the comparison result.

16 Claims, 3 Drawing Sheets

IMAGE ANALYSIS DEVICE AND METHOD THEREOF

BACKGROUND

1. Technical Field

The present disclosure relates to image analysis devices.

2. Description of Related Art

Certain organizations need to monitor and capture photos/images from a particular area, such as a crossroads, via a camera. Each captured image may be analyzed to extract a background model and the image in the foreground. The background model includes those objects that would remain unaltered in a number of images, such as buildings and trees. The foreground image includes those objects that would change from image to image, such as people and cars. Comparison between the foreground images in a number of captured images is used to monitor the conditions and circumstance of the particular area being monitored, such as the quantity and the speed of the cars, and the quantities of pedestrians at different times.

The common method for analyzing the captured image to extract the background model and the foregrounds is to analyze one particular captured image to predetermine one scene as a reference background model for the particular area, and then compare the later captured images against the reference background model to determine the parts which are the same as the reference background model, and then filter out the parts which are the same, to obtain the foreground image from each captured image. However, a single reference background model does not take account of changes in the environment, such as changes in the levels of natural or other light illuminating the monitored area. Then, the background characteristics of the later captured images may be substantially different from those of the single background reference model, which results in the incorrect filtering or extraction of foreground images from the later captured images, or at least the need to adjust each later captured image before a worthwhile foreground image can be obtained from the later captured images.

Therefore, it is desirable to provide an image analysis device and method to overcome the described limitations.

BRIEF DESCRIPTION OF THE DRAWINGS

Many aspects of the present disclosure are better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail, with reference to the accompanying drawings.

Figure 1:
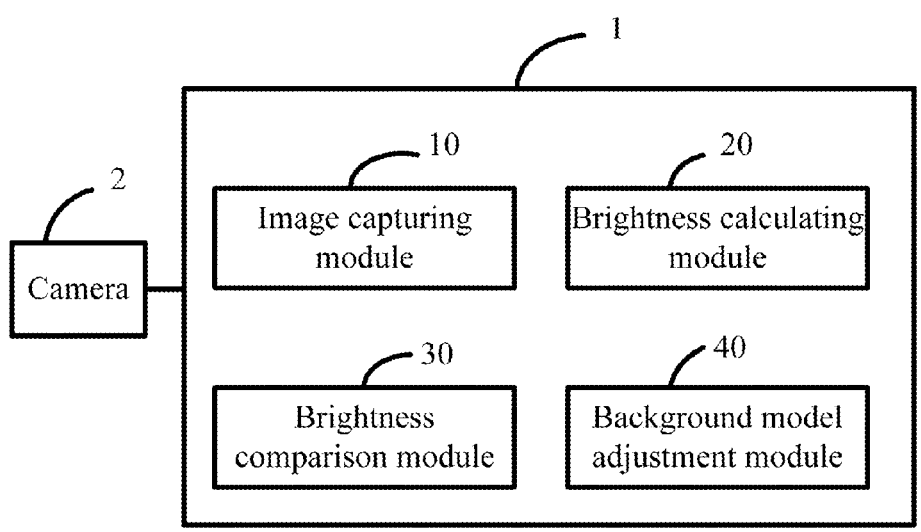
FIG. 1 is a block diagram of an image analysis device, in accordance with an exemplary embodiment.

Referring to FIG. 1, an image analysis device 1 is connected to a camera 2 for monitoring an area, and obtain images of a scene captured by the camera 2 periodically, for example, every 20 milliseconds, and compares each captured image with a reference background model to obtain the foreground image from each captured image, and then analyzes the conditions and circumstance of the monitored area, such as the quantity and speeds of the cars.

As shown in FIG. 1, the image analysis device 1 includes an image capturing module 10, a brightness calculating module 20, a comparison module 30, and a background model adjustment module 40.

The image capturing module 10 is used to obtain an image of the scene. The brightness calculating module 20 is used to obtain at least one brightness value of at least one area of the image obtained by the image capturing module, and obtain a brightness value of the same at lease one area of each of a predetermined number of previous images of the same scene and calculate an average brightness of the same at lease one area of the predetermined number of previous images to obtain at least one average brightness value.

The brightness comparison module 30 compares the at least one brightness value of the image with the at least one average brightness value of the predetermined number of previous images to obtain at least one brightness difference value, and compare the at least one brightness difference value with a first value and a second value greater than the first value, and determine whether the at least one brightness difference value is less than the first value, or equal to or greater than the first value but less than the second value, or equal to or greater than the second value.

The background model adjustment module 40 is used to adjust the reference background model according to a first adjustment mode when the comparison module 30 determines that a majority of the at least one brightness difference value is greater than the first value but is less than the second value, and to adjust the reference background model according to a second adjustment mode when the comparison module 30 determines that a majority of the at least one brightness difference value is equal to or greater than the second value.

In the embodiment, the at least one area of the image and the predetermined number of previous images is the whole image of them. The brightness calculating module 20 obtains the code or data which governs the brightness of each pixel of the image and the predetermined number of previous images, and then calculates the average of the brightness value of the pixels of each image to obtain the brightness value of each one of the image and the predetermined number of previous images. The brightness calculating module 20 also calculates the average brightness value of the predetermined number of images according to the brightness of each one of the predetermined number of images.

In the embodiment, in the first adjustment mode, the background model adjustment module 40 increases or decreases the brightness of the reference background model by the brightness difference value. In the second adjustment mode, the background model adjustment module 40 adjusts the brightness of the reference background model to the average brightness value of the predetermined number of images prior to the currently-obtained image.

Obviously, if the comparison performed by the brightness comparison module 30 compares that the brightness difference value is less than the first value, the background model adjustment module 40 does not adjust the brightness of the reference background model.

Figure 2:
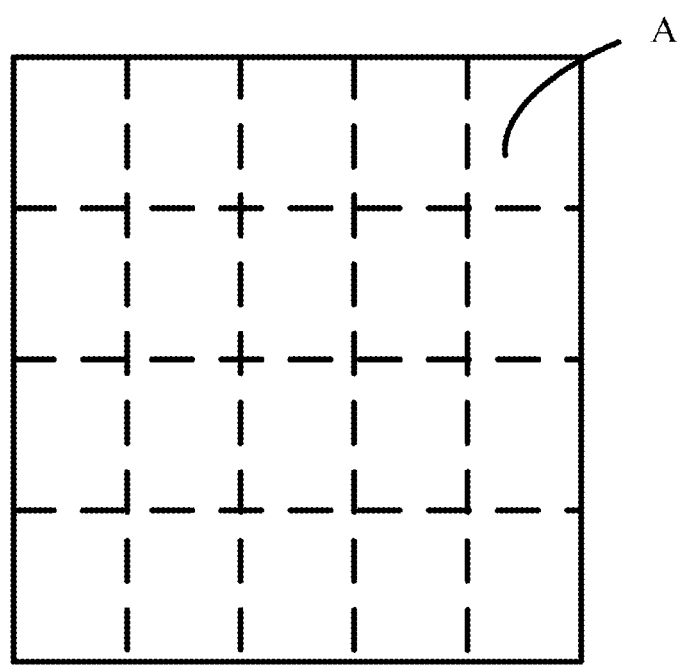
FIG. 2 is a schematic diagram showing an image divided by the image analysis device of FIG. 1.

In another embodiment, as shown in FIG. 2, the brightness calculating module 20 divides each one of the image and the predetermined number of previous images to a number of areas A, and obtain the brightness value of each area A of the image and the predetermined number of previous images by calculating the average of the brightness value of the pixels of each area A, and calculates an average brightness value of the same area A of the predetermined number of previous images to obtain the average brightness value of each area A of the predetermined number of previous images.

The brightness comparison module 30 compares the brightness of each area of the image with the average brightness of the same area of the predetermined number of previous images to obtain a number of brightness difference values, and then compares each brightness difference value with the first value and the second value. The brightness comparison module 30 also classifies each brightness difference value which is found by reference to the first value and the second value.

When the brightness comparison module 30 determines that the majority of brightness difference values (such as 80 percent of all brightness differences) which are found are equal to or greater than the first value but less than the second value, the background model adjustment module 40 adjusts the brightness of the reference background model according to the first adjustment mode. In another embodiment, the background model adjustment module 40 calculates an average brightness difference value based on the brightness difference values obtained by the brightness calculating module 20, and increases or decreases the brightness of the reference background model by the average brightness different value. When the brightness comparison module 30 determines that the majority of brightness differences value (such as 80 percent of all brightness difference values) are equal to or greater than the second value, the background model adjustment module 40 adjusts the brightness of the reference background model according to the second adjustment mode. In another embodiment, the background model adjustment module 40 calculates an average of the average brightness values of the predetermined number of previous images brightness to obtain a total average brightness, and adjusts the brightness of the reference background model to be equal to the total average brightness.

Figure 3:
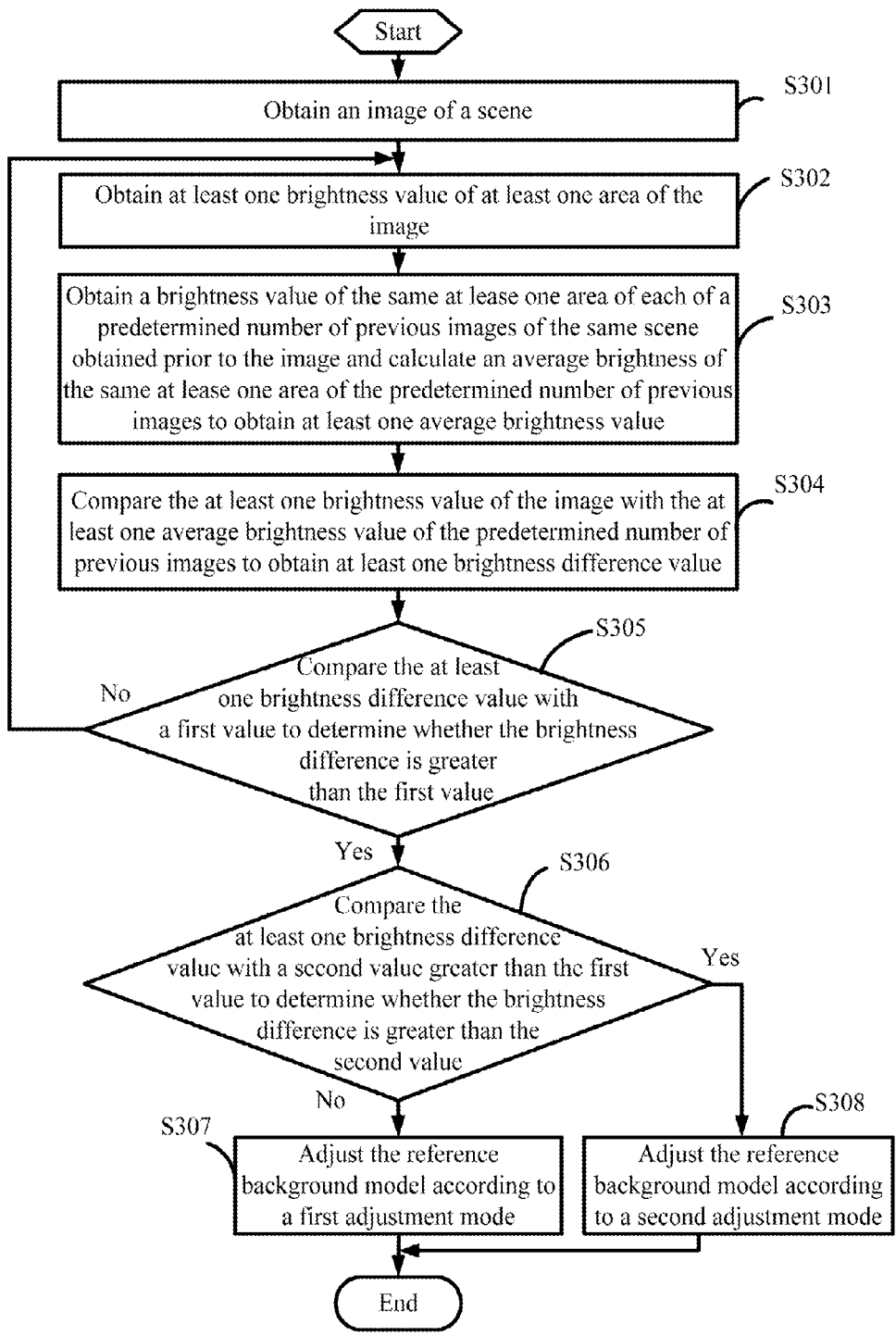
FIG. 3 is a flowchart illustrating a method for analyzing images applied in an image analysis device, such as that of FIG. 1, in accordance with an exemplary embodiment.

FIG. 3 is a flowchart showing a method for analyzing images, applied in the image analysis device of FIG. 1.

In step S301, the image capturing module 10 obtains an image of a scene.

In step S302, the brightness calculating module 20 obtains at least one brightness value of at least one area of the image.

In step S303, the brightness calculating module 20 obtains a brightness value of the same at lease one area of each of a predetermined number of previous images of the same scene and calculate an average brightness of the same at lease one area of the predetermined number of previous images to obtain at least one average brightness value.

In step S304, the brightness comparison module 30 compares the at least one brightness value of the image with the at least one average brightness value of the predetermined number of previous images to obtain at least one brightness difference value.

In step S305, the brightness comparison module 30 compares the at least one brightness difference value with a first value to determine whether a majority of the at least one brightness difference value is greater or less than the first value.

If a majority of the at least one brightness difference value is less than the first value, the process returns to step S302, if not, then in step S306, the brightness comparison module 30 further compares the brightness difference value with a second value (greater than the first value) to determine whether a majority of the at least one brightness difference value is greater than the second value.

If a majority of the at least one brightness difference value is less than the second value, in step S307, the background model adjustment module 40 adjusts the reference background model according to a first adjustment mode. In detail, the background model adjustment module 40 increases or decreases the brightness of the reference background model by the brightness difference.

If a majority of the at least one brightness difference value is equal to or greater than the second value, in step S308, the background model adjustment module 40 adjusts the reference background model according to a second adjustment mode. In detail, the background model adjustment module 40 adjusts the brightness of the reference background model to the average brightness of the predetermined number of images immediately previous to the currently-obtained image.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An image analysis device comprising:
an image capturing module configured to obtain an image of a scene;
a brightness calculating module, configured to obtain at least one brightness value of at least one area of the image obtained by the image capturing module, and obtain a brightness of the same at least one area of each of a predetermined number of previous images of the same scene obtained prior to the image and calculate an average brightness of the same at least one area of the predetermined number of previous images to obtain at least one average brightness value;
a brightness comparison module, configured to compare the at least one brightness value of the image with the at least one average brightness value of the predetermined number of previous images to obtain at least one brightness difference value, and compare the at least one brightness difference value with a first value and a second value greater than the first value; and
a background model adjustment module, configured to adjust a reference background model according to a first adjustment mode when the comparison module determines a majority of the at least one brightness difference value is greater than the first value and is less than the second value, and adjust the reference background model according to a second adjustment mode when the comparison module determines a majority of the at least one brightness difference value is equal to or greater than the second value.

2. The image analysis device according to claim 1, wherein the at least one area is the whole image, the brightness calculating module obtains the code or data which governs the brightness of each pixel of the image and the predetermined number of previous images, and then calculates the average of the brightness value of the pixels of each image to obtain the brightness value of each one of the image and the predetermined number of previous images, then calculates the average brightness value of the predetermined number of previous images according to the brightness value of each one of the predetermined number of previous images.

3. The image analysis device according to claim 1, wherein the background model adjustment module adjusts the reference background model according to the first adjustment mode comprises: the background model adjustment module increases or decreases the brightness of the reference background model by the brightness different value.

4. The image analysis device according to claim 1, wherein the background model adjustment module adjusts the reference background model according to the second adjustment mode comprises: the background model adjustment module adjusts the brightness of the reference background model to the average brightness value of the predetermined number of previous images.

5. The image analysis device according to claim 1, wherein the brightness calculating module divides each one of the image and the predetermined number of previous images to a number of areas, and obtain the brightness value of each area of the image and the predetermined number of previous images by calculating the average of the brightness of the pixels of each area, and calculates an average of the brightness value of the same area of the predetermined number of previous images to obtain the average brightness value of each area of the predetermined number of previous images.

6. The image analysis device according to claim 5, wherein the brightness comparison module compares the brightness value of each area of the image with the average brightness value of the same area of the predetermined number of previous images to obtain a number of brightness difference values, and then compares each brightness difference value with the first value and the second value.

7. The image analysis device according to claim 6, wherein when the brightness comparison module determines that a major of brightness difference values are greater than the first value but less than the second value, the background model adjustment module adjusts the brightness of the reference background model according to the first adjustment mode, and when the brightness comparison module determines that a major of brightness difference values are greater than the second value, the background model adjustment module adjusts the brightness of the reference background model according to the second adjustment mode.

8. The image analysis device according to claim 7, wherein the background model adjustment module adjusts the brightness of the reference background model according to the first adjustment mode comprises: the background model adjustment module calculates an average brightness difference value based on the brightness difference values obtained by the brightness comparison module, and increase or decrease the brightness of the reference background model by the average brightness different value.

9. The image analysis device according to claim 7, wherein the background model adjustment module adjusts the reference background model according to the second adjustment mode comprises: the background model adjustment module calculates an average of the average brightness values of the predetermined number of previous images brightness to obtain a total average brightness, and adjusts the brightness of the reference background model to be equal to the total average brightness.

10. A method for analyzing images, comprising:
  obtaining an image of a scene;
  obtaining at least one brightness value of at least one area of the image;
  obtaining a brightness value of the same at least one area of each of a predetermined number of previous images of the same scene obtained prior to the image and calculating an average brightness of the same at least one area of the predetermined number of previous images to obtain at least one average brightness value;
  comparing the at least one brightness value of the image with the at least one average brightness value of the predetermined number of previous images to obtain at least one brightness difference value;
  comparing the at least one brightness difference value with a first value and a second value greater than the first value;
  adjusting a reference background model according to a first adjustment mode if a majority of the brightness difference value is greater than the first value and is less than the second value; and
  adjusting the reference background model according to a second adjustment mode if a majority of the at least one brightness difference value is equal to or greater than the second value.

11. The method according to claim 10, wherein the step of obtaining a brightness value of the same at least one area of each of a predetermined number of previous images of the same scene obtained prior to the image and calculate an average brightness of the same at least one area of the predetermined number of previous images to obtain at least one average brightness value comprises:
  obtaining the brightness value of the whole image of each one of the predetermined number of previous images; and
  calculating the average brightness of the predetermined number of images according to the brightness value of each one of the predetermined number of images.

12. The method according to claim 10, wherein the step of adjusting a reference background model according to a first adjustment mode if a majority of the brightness difference value is greater than the first value and is less than the second value comprises:
  increasing or decreasing the brightness of the reference background model by the brightness different value.

13. The method according to claim 10, wherein the step of adjusting the reference background model according to a second adjustment mode if a majority of the at least one brightness difference value is equal to or greater than the second value comprises:
  adjusting the brightness of the reference background model to the average brightness of the predetermined number of previous images.

14. The method according to claim 10, wherein the step of obtaining a brightness value of the same at least one area of each of a predetermined number of previous images of the same scene obtained prior to the image and calculating an average brightness of the same at least one area of the predetermined number of previous images to obtain at least one average brightness value comprises:
  dividing each one of the image and the predetermined of previous images to a number of areas;
  obtaining the brightness value of each area of the image and the predetermined of previous images by calculating the average of the brightness of the pixels of each area; and
  calculating an average brightness of each same area of the predetermined number of previous images to obtain the average brightness of each area of the predetermined number of previous images.

15. The method according to claim 14, wherein the step of adjusting a reference background model according to a first adjustment mode if a majority of the brightness difference value is greater than the first value and is less than the second value comprises:

calculating an average brightness difference value based on the brightness difference values; and increasing or decreasing the brightness of the reference background model by the average brightness different value.

16. The method according to claim 14, wherein the step of adjusting the reference background model according to a second adjustment mode if a majority of the at least one brightness difference value is equal to or greater than the second value comprises:

calculating an average of the average brightness values of the predetermined number of previous images brightness to obtain a total average brightness; and adjusting the brightness of the reference background model to be equal to the total average brightness.

* * * * *